United States Patent
Hayakawa

(10) Patent No.: US 10,999,454 B2
(45) Date of Patent: May 4, 2021

(54) INFORMATION PROCESSING METHOD, INFORMATION PROCESSING APPARATUS, AND STORAGE MEDIUM THAT GENERATE, FOR EACH OF A PLURALITY OF IMAGES, RELIABILITY INFORMATION INDICATING RELIABILITY OF DATE AND TIME INFORMATION, AND NOTIFY A USER ACCORDINGLY

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/140,849

(22) Filed: Sep. 25, 2018

(65) Prior Publication Data

US 2019/0104221 A1     Apr. 4, 2019

(30) Foreign Application Priority Data

Oct. 3, 2017   (JP) .............................. JP2017-193535

(51) Int. Cl.
*H04N 1/00*     (2006.01)
*G06F 3/0486*   (2013.01)
*G06K 9/62*     (2006.01)

(52) U.S. Cl.
CPC ..... *H04N 1/00196* (2013.01); *H04N 1/00143* (2013.01); *H04N 1/00456* (2013.01); *G06F 3/0486* (2013.01); *G06K 9/623* (2013.01)

(58) Field of Classification Search
None
See application file for complete search history.

(56) References Cited

U.S. PATENT DOCUMENTS

| 2009/0323107 A1* | 12/2009 | Maeda | G03G 15/50 358/1.15 |
| 2016/0259604 A1* | 9/2016 | Hayakawa | G06F 16/532 |
| 2017/0039745 A1* | 2/2017 | Hayakawa | H04N 1/00161 |
| 2018/0218526 A1* | 8/2018 | Hayakawa | H04N 1/00167 |

FOREIGN PATENT DOCUMENTS

| JP | 2009-267600 | * | 11/2009 |
| JP | 2010-072934 A | | 4/2010 |
| JP | 5094528 B2 | | 12/2012 |

OTHER PUBLICATIONS

English Translation of Matsushita Takashi, JP 2009-267600 (Year: 2009).*

* cited by examiner

*Primary Examiner* — King Y Poon
*Assistant Examiner* — Pawan Dhingra
(74) *Attorney, Agent, or Firm* — Venable LLP

(57) ABSTRACT

An information processing method includes steps of obtaining a plurality of images and date and time information on the plurality of images, setting, for each of the plurality of images, reliability information indicating reliability of the date and time information as photographing date and time, scoring each of the plurality of images by analyzing, laying out at least a part of the plurality of images on a template based on the date and time information and a score obtained by the scoring, and notifying a message to a user based on the set reliability information. When an image that does not have photographing date and time information is obtained, low reliability information is set to the image. When the image is laid out on the template, the message is notified to a user based on the low reliability information.

24 Claims, 11 Drawing Sheets

| IMAGE ID | FILE NAME | PHOTOGRAPHING DATE AND TIME | RELIABILITY |
|---|---|---|---|
| 1001 | IMG0001.jpg | 2017/07/27 10:10:10 | true |
| 1002 | IMG0002.jpg | 2017/07/27 12:11:10 | false |
| 1003 | IMG0003.jpg | 2017/07/27 14:12:10 | true |
| 1004 | IMG0004.jpg | 2017/07/27 15:13:12 | true |
| 1005 | IMG0005.jpg | 2017/07/27 17:23:24 | true |
| 1006 | IMG0006.jpg | 2017/07/27 21:33:09 | true |

| SLOT ID | POSITION(x,y) | SIZE(w,h) |
|---|---|---|
| 4001 | 30,30 | 320,270 |
| 4002 | 450,60 | 200,160 |
| 4003 | 100,320 | 200,160 |
| 4004 | 450,320 | 200,160 |

| IMAGE ID | FILE NAME | PHOTOGRAPHING DATE AND TIME | RELIABILITY |
|---|---|---|---|
| 1001 | IMG0001.jpg | 2017/07/27 10:10:10 | true |
| 1002 | IMG0002.jpg | 2017/07/27 12:11:10 | false |
| 1003 | IMG0003.jpg | 2017/07/27 14:12:10 | true |
| 1004 | IMG0004.jpg | 2017/07/27 15:13:12 | true |
| 1005 | IMG0005.jpg | 2017/07/27 17:23:24 | true |
| 1006 | IMG0006.jpg | 2017/07/27 21:33:09 | true |

FIG.5

| IMAGE ID | FILE NAME | IMAGE DATA | SCORE |
|---|---|---|---|
| 1001 | IMG0001.jpg | BLOB data | 124 |
| 1002 | IMG0002.jpg | BLOB data | 10 |
| 1003 | IMG0003.jpg | BLOB data | 66 |
| 1004 | IMG0004.jpg | BLOB data | 102 |
| 1005 | IMG0005.jpg | BLOB data | 156 |
| 1006 | IMG0006.jpg | BLOB data | 50 |

FIG.6

| SLOT ID | POSITION(x,y) | SIZE(w,h) | IMAGE ID |
|---|---|---|---|
| 4001 | 30,30 | 320,270 | 1001 |
| 4002 | 450,60 | 200,160 | 1003 |
| 4003 | 100,320 | 200,160 | 1004 |
| 4004 | 450,320 | 200,160 | 1005 |

FIG.7

| IMAGE ID | FILE NAME | IMAGE DATA | SCORE |
|---|---|---|---|
| 1001 | IMG0001.jpg | BLOB data | 124 |
| 1002 | IMG0002.jpg | BLOB data | 122 |
| 1003 | IMG0003.jpg | BLOB data | 66 |
| 1004 | IMG0004.jpg | BLOB data | 102 |
| 1005 | IMG0005.jpg | BLOB data | 10 |
| 1006 | IMG0006.jpg | BLOB data | 50 |

FIG.8

| SLOT ID | POSITION(x, y) | SIZE(w, h) | IMAGE ID |
|---|---|---|---|
| 4001 | 30,30 | 320,270 | 1001 |
| 4002 | 450,60 | 200,160 | 1002 |
| 4003 | 100,320 | 200,160 | 1003 |
| 4004 | 450,320 | 200,160 | 1004 |

FIG.9

PHOTOGRAPHS MAY NOT BE LAID OUT IN PHOTOGRAPHING ORDER.
PLEASE CONFIRM WHETHER THE PHOTOGRAPHS
ARE ARRANGED CORRECTLY.

TIPS
  PHOTOGRAPHS MAY BE REARRANGED BY DRAGGING.
  PAGES MAY BE REARRANGED BY DRAGGING.

INFORMATION PROCESSING METHOD, INFORMATION PROCESSING APPARATUS, AND STORAGE MEDIUM THAT GENERATE, FOR EACH OF A PLURALITY OF IMAGES, RELIABILITY INFORMATION INDICATING RELIABILITY OF DATE AND TIME INFORMATION, AND NOTIFY A USER ACCORDINGLY

BACKGROUND OF THE INVENTION

This application claims the benefit of Japanese Patent Application No. 2017-193535 filed Oct. 3, 2017, which is hereby incorporated by reference herein in its entirety.

FIELD OF THE INVENTION

The present invention relates to an information processing method and an information processing apparatus for laying out a plurality of images captured by a digital camera, and the like, based on a template.

DESCRIPTION OF THE RELATED ART

Japanese Patent Laid-Open No. 2010-072934 discloses a photo album creation technique, where features of images are analyzed and the images are automatically laid out into a preferable format based on data files that a user wishes to put on a photo album and specified, and a favorite template is selected by the user.

Meanwhile, Japanese Patent No. 5094528 discloses a technique of updating photographing date and time information by allowing a user to rearrange thumbnails of photo images. More specifically, by arranging and displaying a plurality of photo images as thumbnails and allowing the user to rearrange the order of the photo images while dragging, photographing date and time information on an image having less reliable photographing date and time information is estimate, and stored, based on the photographing date and time information on adjacent images.

SUMMARY OF THE INVENTION

In creating a photo album, and the like, photo images are often arranged according to the order of photographing date and time. In a traditional photo album automatic creation tool, an image having a less reliable photographing date and time may be handled with a low priority, and the image may be excluded from an automatic layout. However, even if the stored photographing date and time information is less reliable, a user may wish to include the image in an album with a high priority.

More specifically, a user sometimes uses editing software to process an image that he/she wishes to particularly include in an album among the image files after photographing, but some editing software may delete photographing date and time information. Furthermore, in a case when an image shared by a plurality of users, such as a group photo, is transmitted and received through a social networking service (SNS), and the like, the photographing date and time information may be deleted for the purposes of reduction of data volume, privacy protection, and the like.

Even if photographing date and time information is deleted from an image, with the use of the device in Japanese Patent No. 5094528 for rearrangement of images before creating a photo album, the photographing date and time information may be attached to the image by the time a photo album is created and the image may be included in the album. However, manually laying out all images while checking the order every time a photo album is created is troublesome to a user. Incidentally, such a problem commonly occurs not only in creating a photo album, but also, in laying out a plurality of images.

The present invention has been made to solve the above problem. Accordingly, an object of the present invention is to create a layout result in which images having a high priority for a user are laid out according to the order of photographing date and time, without putting a load on the user.

According to a first aspect, the present invention provides an information processing method of generating a layout result by laying out a plurality of images on a template. The method comprises the steps of obtaining photographing date and time information on the plurality of images and reliability information indicating reliability of the photographing date and time information, scoring each of the plurality of images by analyzing, laying out each of the plurality of images on the template based on the photographing date and time information and a score obtained in the scoring, and notifying a message to a user in a case when the laid out images include an image having a low reliability of the photographing date and time information, based on the reliability information.

According to a second aspect, the present invention provides an information processing apparatus for generating a layout result by laying out a plurality of images on a template. The apparatus comprises an obtaining unit configured to obtain photographing date and time information on the plurality of images and reliability information indicating reliability of the photographing date and time information a scoring unit configured to score each of the plurality of images by analyzing, a layout unit configured to lay out each of the plurality of images on the template based on the photographing date and time information and a score obtained by the scoring unit, and a notifying unit configured to notify a message to a user in a case when the images laid out by the layout unit include an image having a low reliability of the photographing date and time information, based on the reliability information.

According to a third aspect, the present invention provides a non-transitory computer-readable storage medium that stores a program for causing one or more processors to perform an information processing method of generating a layout result. The information processing method comprises the steps of obtaining photographing date and time information on a plurality of images and reliability information indicating reliability of the photographing date and time information scoring each of the plurality of images by analyzing, laying out each of the plurality of images on a template based on the photographing date and time information and a score obtained in the scoring, and notifying a message to a user in a case when the images laid out in the laying out include an image having a low reliability of the photographing date and time information, based on the reliability information.

Further features of the present invention will become apparent from the following description of exemplary embodiments with reference to the attached drawings.

BRIEF DESCRIPTION OF THE DRAWINGS

FIG. 5 is a diagram showing an example of an image file list.

FIG. 6 is a diagram showing an example of a scoring result of image files.

FIG. 7 is a diagram showing a corresponding relation between a slot ID and an image ID.

FIG. 8 is a diagram showing another example of a scoring result of image files.

FIG. 9 is a diagram showing a corresponding relation between a slot ID and an image ID.

FIG. 10 is a diagram showing an example of a message.

DESCRIPTION OF THE EMBODIMENTS

Figure 1:
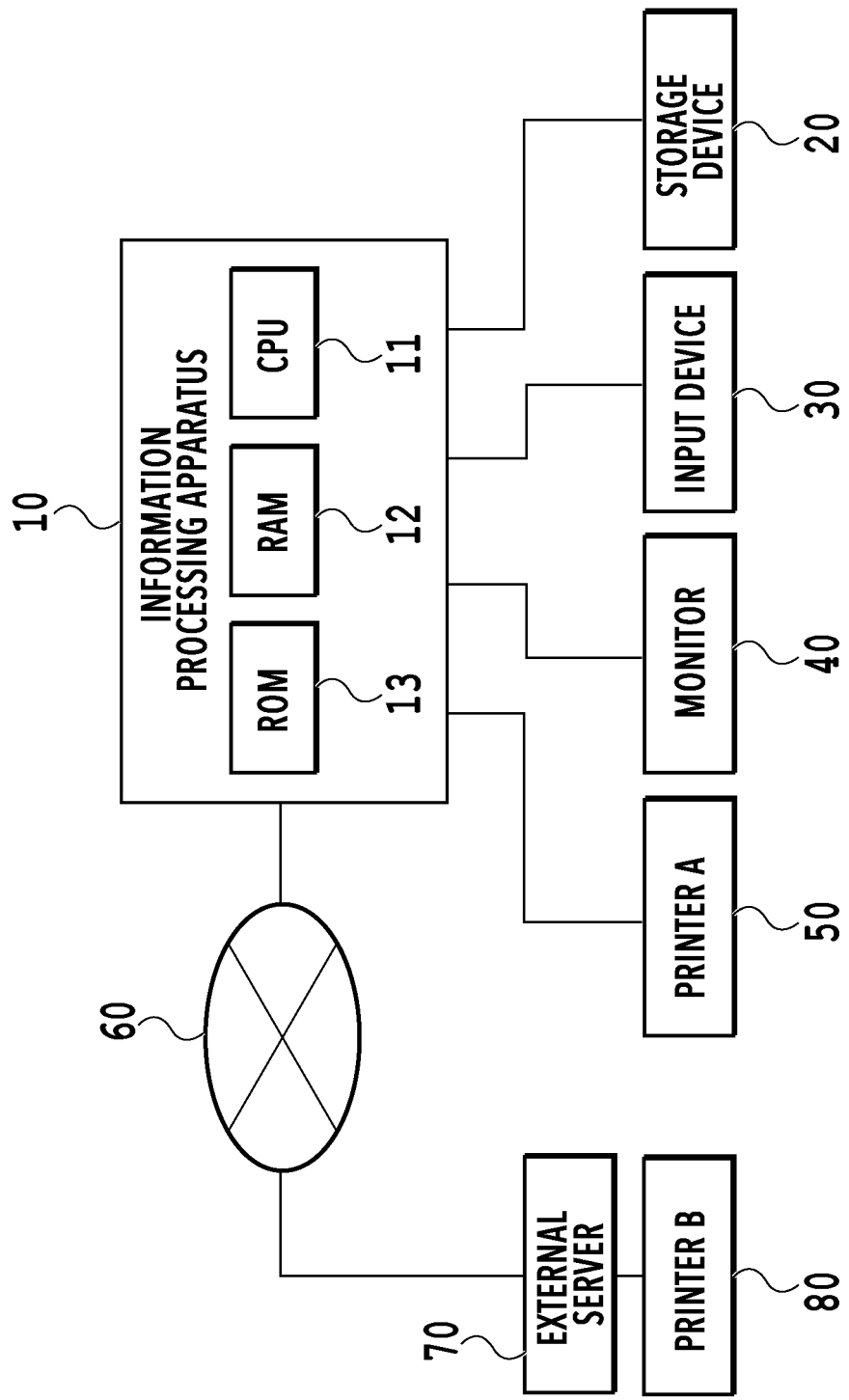
FIG. 1 is a block diagram for explaining a control configuration in a photo album creating system.

FIG. 1 is a block diagram for explaining a control configuration of a photo album creating system that can be used in the present invention.

An information processing apparatus 10 is composed of, for example, a personal computer, and includes a CPU 11, a RAM 12, a ROM 13, and the like. To the outside of the information processing apparatus 10, a storage device 20, an input device 30, a monitor 40, and a printer A 50 are connected.

The CPU 11 has control over the entire apparatus by using the RAM 12 as a work area in accordance with programs stored in the RAM 12, the ROM 13, and the storage device 20. The storage device 20 is composed of a hard disk drive (HDD), a solid state drive (SSD), and the like, and stores image files and template files to be used in the present embodiment, as well as various programs executed by the CPU 11.

The input device 30 may be a keyboard, a mouse, a pointing device, and the like, and is a device for a user to input a command to the information processing apparatus 10. The monitor 40 is a device for displaying to a user information from the information processing apparatus 10. The input device 30 and the monitor 40 may be integrally formed as a touch screen format. Although FIG. 1 shows an aspect in which the storage device 20, the input device 30, and the monitor 40 are connected to the outside of the information processing apparatus, these devices may be included in the information processing apparatus 10.

In the above-described configuration, under a user instruction via the input device 30 and the monitor 40, the information processing apparatus 10 can create photo album data and photobook data by using image files stored in the storage device 20 in accordance with a predetermined program.

The printer A 50 is directly connected to the information processing apparatus 10 and can print an image in accordance with print data received from the information processing apparatus 10. For instance, a user can cause the printer A 50 to print images for an album based on the album data created by the information processing apparatus 10. In this case, the user by himself/herself can bind printed materials after printing and complete an album.

Meanwhile, the information processing apparatus 10 is also connected to an external server 70 via a network 60 and can upload images of the created album to the external server 70. The external server 70 is connected to a printer B 80 and can communicate with the printer B 80 using an input/output interface (not shown). For example, in a case when the external server 70 is a management server of an album creation service, the user can upload the album data created by the information processing apparatus 10 to the external server 70 and go through the procedure of ordering an album. In this case, the service that has received the order causes the printer B 80 to print images for an album based on the album data uploaded to the external server 70, then binds printed materials, and sends a completed album to the user.

Figure 2:
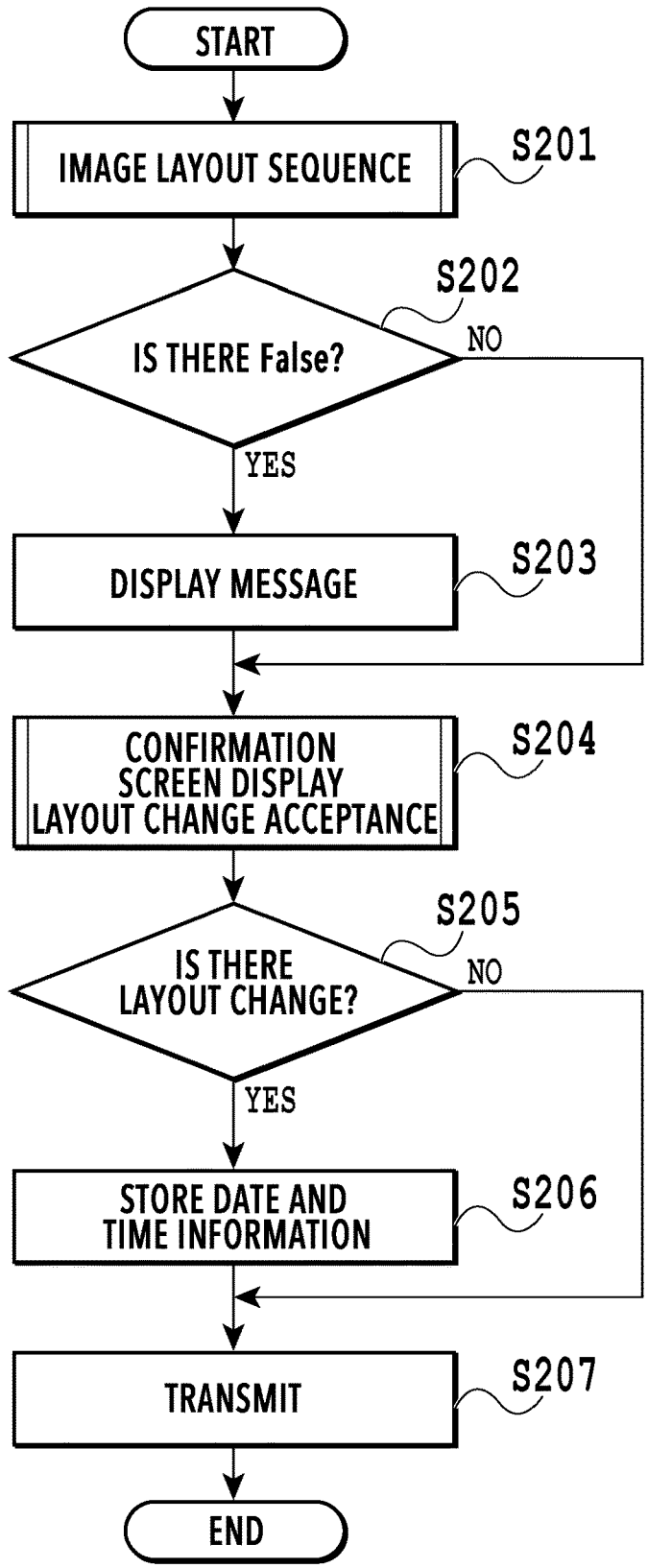
FIG. 2 is a flowchart performed by an information processing apparatus in a case when an album creation job is generated.

FIG. 2 is a flowchart for explaining processing performed by the CPU 11 of the information processing apparatus 10 in a case when an album creation job is generated. The present processing is started if a user activates predetermined application software for creating a photo album, and performed by the CPU 11 using the RAM 12 as a work area in accordance with programs stored in the RAM 12 and the ROM 13.

If the present processing is started, in step S201, the CPU 11 first performs an image layout sequence.

Figure 3:
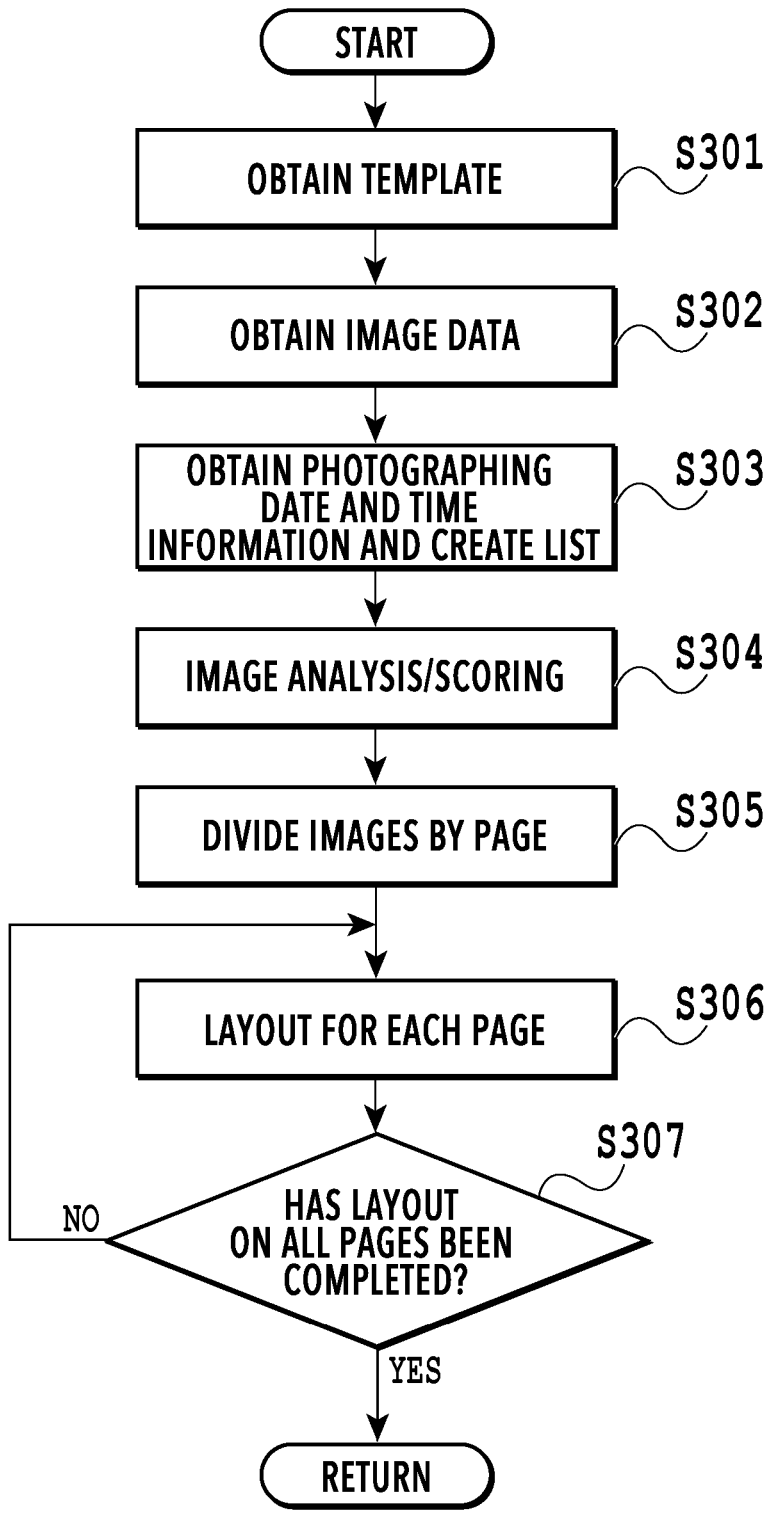
FIG. 3 is a flowchart for explaining processing steps in an image layout sequence.

FIG. 3 is a flowchart for explaining the processing steps of the processing performed by the CPU 11 in the image layout sequence in step S201. In step S301, the CPU 11 first loads a template selected by the user from the storage device 20.

A more specific description will be given. The CPU 11 displays a plurality of templates that can be provided to the monitor 40 and receives a selection instruction from the user. At this time, the user selects a favorite design from the plurality of templates and specifies a size and the number of pages of an album to be created, the maximum number of images that can be laid out on each page, and the like. However, in a case when a design, a size, and the number of pages are specified in advance, the present step may be omitted. The CPU 11 accesses the storage device 20, reads and loads the selected template to the RAM 12.

Figures 4A, 4B:
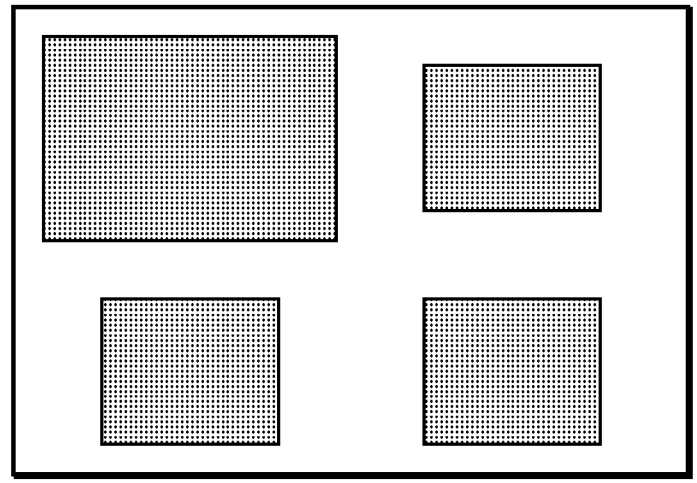
FIG. 4A and FIG. 4B are diagrams showing an example of a template.

FIG. 4A and FIG. 4B are diagrams showing an example of the template loaded to the RAM 12. In the example, four images are laid out on one double-page spread as shown in FIG. 4A. A reference point and a size of the area, namely, coordinates (x, y) of the upper left point, a width (W) in an x direction, and a height (h) in a y direction, are associated with each of slot IDs 4001 to 4004 and managed as shown in FIG. 4B.

It should be noted that the example shows the case when four photographs are laid out on one double-page spread, but needless to say, the number of photographs is not limited to four. The number of images laid out on one page may be changed later in various processes, in addition to the type of template selected in step S301. In the present embodiment, template information shown in FIG. 4A and FIG. 4B is prepared in advance for each of the cases of one to four images, for example, to cope with the change in the number of images to be finally laid out on each page.

Referring back to FIG. 3, in step S302, the CPU 11 receives the specification of a folder that stores image files to be used for the photo album from the user, accesses the storage device 20, reads out all of the image files from the specified file and loads them to the RAM 12. Then, in step S303, the CPU 11 analyzes the image files loaded to the RAM 12 and creates a list in the order of photographing date and time.

FIG. 5 is a diagram showing an example of a list created by the CPU 11 in step S303. The CPU 11 puts all of the image files included in the folder specified in step S302 in the order of photographing date and time, gives ID numbers, and arranges them. For simplicity of explanation, a case of including six image files in a folder is shown, but a larger number of image files may be included. In the list, a file name, a photographing date and time, and reliability information on each image file are associated with each image ID and managed.

In this example, the photographing date and time represents a date and time when a corresponding image is captured by a digital camera, and the like, and first obtained as image data. In a case when the photographing date and time information is included in image data itself, such as Exif photographing information and Extensible Metadata Platform (XMP), the CPU 11 adds the information to the list and sets "true" to reliability.

As used herein, the term "true" refers to the photographing date and time information with a high reliability. Even if copying or moving is performed after photographing and before storing in the storage device 20, the Exif photographing information and Extensible Metadata Platform (XMP) will not be rewritten. In addition, even if the image data is subjected to various kinds of processing by some application, the above information will hardly be rewritten. In this manner, since the reliability of the photographing date and time information is sufficiently high in a file in which the image data itself includes photographing date and time information, the CPU 11 sets "true."

In a case of image data communicated through a social networking service (SNS), photographing date and time information as well as posting date and time information may be communicated separately from the image data. Even in such a case, since reliability of the photographing date and time information itself is high, the CPU 11 sets "true." Also, in a case when there is no photographing date and time information, but there is only posting date and time information, the CPU 11 regards the posting date and time information as photographing date and time information, adds it to the list, and sets "true."

In a case other than the above, that is, in a case when the image data itself does not include photographing date and time information or the photographing date and time information is not attached to the image data, the CPU 11 estimates photographing date and time information from a time stamp of the image data. The time stamp includes information such as a file creation date and time, a file load date and time, and a file update date and time. The CPU 11 adds the oldest date and time among the plurality of pieces of date and time information to a photographing date and time field as temporal photographing date and time information, and sets "false," which refers to a low reliability of the photographing date and time information, in a reliability field.

Now, the reliability of the photographing date and time information estimated from time stamp information will be simply described. Since a digital camera, or the like, stores obtained image data in an external medium such as an SD card at the time an image is captured, a file creation date and time and a file update date and time match with a photographing date and time. Then, in a case when information in the SD card is copied to the storage device 20 via the information processing apparatus 10, since a file is newly created in the storage device 20, the file creation date and time corresponds to the date and time the file is copied. However, since update processing of the file is not performed, the file update date and time remains the same. That is, in such a case, the file update date and time stored in the time stamp is the oldest date and time, and is added as the photographing date and time in the list shown in FIG. 5.

In a case when the information processing apparatus 10 is a portable device with a camera, such as a smartphone, the captured image data is directly stored in the information processing apparatus 10, and, thus, a file creation date and time and a file update date and time match with a photographing date and time. After that, if the user performs image processing such as effect processing or filter processing and the file is updated, the file update date and time is overwritten. However, since a file is not newly created, the file creation date and time remains the same. That is, in such a case, the file creation date and time stored in the time stamp is the oldest date and time, and is added as the photographing date and time in the list shown in FIG. 5.

Meanwhile, in a case when image data on which image processing is performed on a smartphone, for example, is transmitted to the information processing apparatus 10 through an SNS, or the like, and stored in the storage device 20, the file creation date and time, and the file update date and time are different from the photographing date and time. In such a case as well, the CPU 11 selects the oldest date and time from the dates and times stored in the time stamp, and adds it to the photographing date and time field.

That is, the photographing date and time selected from the time stamp and stored may or may not match with the actual photographing date and time. Therefore, in the present embodiment, "false" is set in the reliability field as an indication.

Referring back to FIG. 3, if the creation of the list in step S303 is finished, the CPU 11 proceeds to step S304 and performs analysis and scoring of each piece of image data based on the created list. The scoring is an operation of converting a layout priority into a numerical form for each image file. As the numerical value increases, a possibility that an image file is arranged into a slot at the time of being laid out increases. A scoring method is not particularly limited. A score value may be obtained, for example, based on rating information stored in image meta information or by calculation with an original function using a face detection result, a histogram of image data, and a frequency analysis result. Furthermore, a coefficient may be prepared such that a score of an image having a reliability of "true" in the list shown in FIG. 5 increases and a score of an image having a reliability of "false" in the list shown in FIG. 5 decreases. At this time, image data used in the scoring is converted into a Binary Large Object (hereafter referred to as BLOB) format so as to be stored in a database.

FIG. 6 is a diagram showing an example of a scoring result of image IDs 1001 to 1006 listed in FIG. 5. In this example, the list created in step S303 (FIG. 5) and the scoring result obtained in step S304 (FIG. 6) are shown in different diagrams, but the scoring result may be stored as one of the items in the list shown in FIG. 5.

Referring back to FIG. 3, in step S305, the CPU 11 allocates all image files to a plurality of pages. For example, in a case when the number of image files included in the list matches with the number of pages P, one image is allocated to each page, and the present allocation step is finished. In a case when the number of images is fewer than the number of pages P, a message is notified to a user to reduce the number of pages or to create a page to which no image is allocated.

Usually, the number of image files often exceeds the number of pages P, and, in this case, the CPU 11 divides the plurality of images into groups corresponding to the number of pages specified in step S301. More specifically, first, for the image files arranged in the order of photographing date and time, a time difference between the photographing date and time of an image file and that of an adjacent image file is obtained. Then, the plurality of image files are divided into two groups in a position with a greatest photographing time difference. Next, in a position with a second greatest photographing time difference, the group including the position is further divided into two. In this manner, division of an individual group is repeated in decreasing order of photographing time difference, and the present step is finished if the number of groups matches with the number of pages P. This allows allocation of one or more pieces of image data to each page for the number of pages P specified in step S301.

It should be noted that a dividing method is not limited to this. For example, even with a small time difference in photographing date and time, an image having a reliability of "true" and an image having a reliability of "false" may be easily divided by a boundary therebetween. Furthermore, in a case when the photographing date and time of a large number of image files is included in a short period of time, the image files may be divided into a plurality of groups according to an element other than the photographing date and time. For example, image files may be divided into backgrounds and portraits or into person photographs and group photographs, or image files may be divided such that images of the same person may be included in the same group.

In step S306, the CPU 11 lays out the image data included in each group as divided in step S305 in each area of the template shown in FIG. 4A and FIG. 4B.

For example, in the case of the template shown in FIG. 4A and FIG. 4B, four areas (slots) are prepared. Accordingly, the CPU 11 selects four images having a high score from a target group. For instance, in a case when the scoring result of the target group is as shown in FIG. 6, scores decrease in the order from image IDs 1005, 1001, 1004, 1003, 1006, and 1002. Out of these image IDs, the CPU 11 then selects the top four image IDs 1005, 1001, 1004, and 1003 and assigns them to slot IDs 4001 to 4004 in the order of photographing date and time. More specifically, the image ID 1005 is assigned to the slot ID 4001, the image ID 1001 to the slot ID 4002, the image ID 1004 to the slot ID 4003, and the image ID 1003 to the slot ID 4004.

FIG. 7 is a diagram showing a corresponding relation between a slot ID and an image ID. By associating a slot ID with an image ID for each page, it is possible to manage which image is laid out in which position.

It should be noted that description has been given of the case when the number of images (6) included in the target group is greater than the number of slots (4) prepared in the template, but there may also be a case when the number of images included in a target group is fewer than the number of slots being prepared. In such a case, the layout on the template may be switched from 4-image display to 3-image display or fewer, and the above-described processing may be performed in the same manner. Furthermore, it is possible that a lowest score value necessary for the layout on the template is set in advance in step S306, and image data having a score value less than the lowest score value is removed from candidates for the layout even if the template has a margin to which image data can be laid out.

Referring back to FIG. 3, after the layout of the target image group on the template is finished in step S306, the process proceeds to step S307 and the CPU 11 determines whether layout processing on all of the pages in the template (i.e., all groups in the image data) is completed. In a case when there is still a page (group) to be laid out, the process goes back to step S306 and the CPU 11 performs layout processing on the next page (group) to be processed. Meanwhile, in a case when it is determined that there is no page (group) to be laid out in step S307, the present processing (the image layout sequence) is finished, and the process goes back to the flowchart of FIG. 2.

A description has been given of the case when only the image data having a reliability of "true" is laid out on the template with the example of the scoring result shown in FIG. 6, but there may also be a case when the image data having a reliability of "false" is laid out on the template.

FIG. 8 is a diagram showing another example of a scoring result of six image IDs 1001 to 1006 listed in FIG. 5. In this example, a score value of the image ID 1002 having a reliability of "false" is relatively high. In a case when images are laid out on the areas of the template shown in FIG. 4A and FIG. 4B based on the scoring result of FIG. 8, the CPU 11 selects image IDs 1001, 1002, 1004, and 1003 as the top four image data. Then, if the top four image data are assigned to slot IDs 4001 to 4004 in the order of photographing date and time, a corresponding relation between a slot ID and an image ID is as shown in FIG. 9. That is, in the case of the present example, the image ID 1002 having a reliability of "false" is also laid out on the template.

In short, at a point when a series of image layout sequence described with reference to FIG. 3 is finished, it is probable that the created album data includes a page including image data having a reliability of "false."

Referring back to the flowchart of FIG. 2, after the image layout sequence is finished in step S201, the CPU 11 proceeds to step S202 and determines whether the album data in which the images are laid out in step S201 includes an image having a reliability of "false." More specifically, the CPU 11 references the list shown in FIG. 5 and determines whether the image IDs included in each page shown in FIG. 7 and FIG. 9 include image data having a reliability of "false." Then, in a case when it is determined that image data having a reliability of "false" is included, the CPU 11 proceeds to step S203 and displays a predetermined message. Meanwhile, in a case when it is determined that image data having a reliability of "false" is not included, the CPU 11 jumps to step S204.

FIG. 10 is a diagram showing an example of a message displayed in step S203. The message is displayed on the monitor 40 based on text data stored in advance in the ROM 13, and the like, and read by the CPU 11. By checking the message, the user can recognize that the current album data includes a possibility of an error in the arrangement order of the photographing date and time. If the user clicks an OK button after checking the message, the CPU 11 proceeds to step S204.

Figure 11:
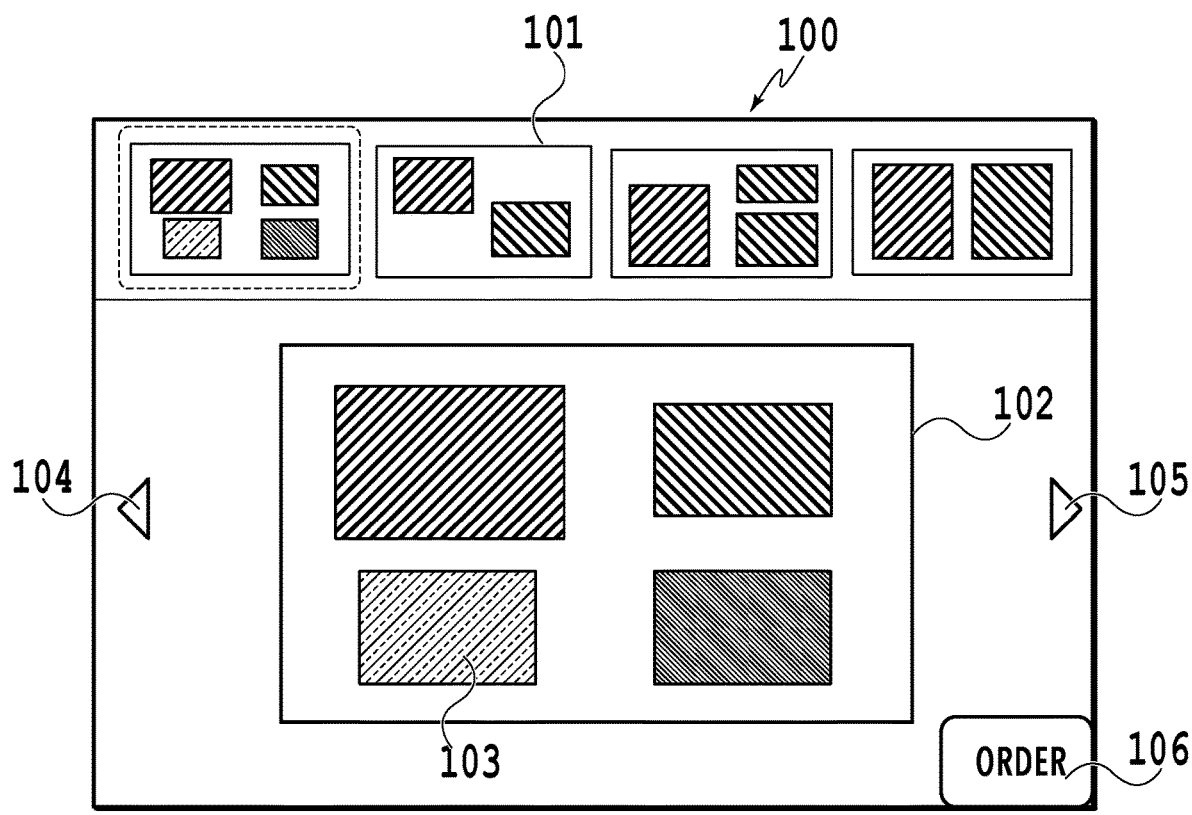
FIG. 11 is a diagram showing an album confirmation/editing screen.

In step S204, the CPU 11 displays an album confirmation/editing screen shown in FIG. 11. On this screen, the CPU 11 uses the album data created in step S201 and displays on the monitor 40 according to a predetermined format. On this screen, the user can confirm a current layout result of the album data and also change the layout by using the input device 30, such as a mouse.

In an upper part, a list of thumbnails 101 corresponding to a plurality of pages is shown. In a lower part, an enlarged image layout 102 on a double-page spread selected in the upper part is shown. On both sides of the enlarged image layout 102, switching buttons 104 and 105 for switching the double-page spread to be displayed in the enlarged image layout are provided. By clicking the buttons, the user can select a page intended to be enlarged and displayed from the plurality of pages displayed in the upper part. It should be noted that in a case when thumbnails for all of the pages cannot be displayed in the upper part, a scroll bar, and the like, may be provided so as to adjust a display position.

FIG. 11 shows a state when a thumbnail of the double-page spread on the left end in the upper part (given that the double-page spread corresponds to pages 1 and 2) is selected and the double-page spread of pages 1 and 2 is enlarged and displayed in the lower part. At this time, the CPU 11 may display with a marker an image having a reliability of "false" as to the photographing date and time or a page including such an image to prompt a user for confirmation.

While confirming the screen shown in FIG. 11, the user can drag and drop an image 103 that he/she wishes to change a layout position to move the image 103 to a preferable position. More specifically, the movement can be achieved, within the enlarged image layout 102 displaying the double-page spread of pages 1 and 2, by dragging the image 103 arranged on page 1 to move to another slot (arrangement area), and dropping the image 103 on the slot. The image 103 can also be moved to another double-page spread displayed in the thumbnail list in the upper part. For example, in a case when the user wishes to move the image 103 to a double-page spread of pages 5 and 6, while dragging the image 103 arranged on page 1, the user moves the image 103 to a thumbnail corresponding to the double-page spread of pages 5 and 6 in the thumbnail list. Then, by overlaying the image 103 on the thumbnail corresponding to the double-page spread of pages 5 and 6 while dragging at least part of the image 103, the display of the enlarged image layout 102 in the lower part changes from the double-page spread of pages 1 and 2 to the double-page spread of pages 5 and 6. In this state, by moving the image 103 being dragged to a desired slot on pages 5 and 6 displayed in the enlarged image layout 102 to overlay at least part of the image 103 on the slot, the image 103 is arranged into the slot. In the present embodiment, this operation allows movement of the image after laid out.

Furthermore, in the present embodiment, movement by page is also available. The movement by page can be achieved by moving a thumbnail corresponding to any double-page spread in the thumbnail list shown in the upper part to another position in the thumbnail list. More specifically, after dragging the thumbnail corresponding to the double-page spread of pages 1 and 2, a drag-and-drop operation is performed between the thumbnail corresponding to the double-page spread of pages 3 and 4 and the thumbnail corresponding to the double-page spread of pages 5 and 6. This operation allows the double-page spread originally corresponding to pages 1 and 2 to be a new double-page spread of pages 3 and 4. Images included in the same page often share some element. Thus, allowing the movement by page while confirming the thumbnail is a highly convenient application for a user in configuring the entire album with the concept maintained within pages. Then, every time the movement by image or movement by page is performed, the CPU 11 updates the corresponding relation between the slot ID and the image ID shown in FIG. 7 and FIG. 9 and displays on a screen the latest layout after the movement. It should be noted that in the above example, the operation of displaying and replacing the page order is performed for each double-page spread corresponding to two pages, but the operation of displaying and replacing may be performed for each page.

After the above confirmation and editing are finished and a final layout of an album is confirmed, the user clicks an order button 106 in the lower-right corner of the screen. Upon receiving an order command from the user, the CPU 11 proceeds to step S205 and determines whether there is any change in the image layout before and after step S204.

If it is determined that there is change in the layout in step S205, the CPU 11 proceeds to step S206 and rewrites the date and time information. More specifically, in a case when an image having a reliability of "false" is moved, date and time information on the image is updated based on a photographing date and time of images having a reliability of "true" arranged before and after the position of the image after the movement. For instance, as stated above, it is assumed that the double-page spread originally corresponding pages 1 and 2 is inserted between the double-page spread of pages 3 and 4 and the double-page spread of pages 5 and 6. In this case, the date and time information on the image in the double-page spread of new pages 3 and 4 (old pages 1 and 2) is updated to date and time information between the date and time information on the image in the double-page spread of new pages 1 and 2 (old pages 3 and 4) and the date and time information on the image in the double-page spread of pages 5 and 6. By updating the date and time information in this step, images can be laid out in the order of date and time information as updated in creating a new photo album in the future.

Incidentally, in step S204, also for an image having a reliability of "true," movement according to user preferences is accepted. Accordingly, it is preferable to update the photographing date and time information in step S206 only for image data having a reliability of "false."

If photographing date and time information is updated in step S206, the CPU 11 proceeds to step S207. Meanwhile, even if it is determined that there is no change in the image layout before and after step S204 in step S205, the CPU directly proceeds to step S207. Then, in step S207, the CPU 11 transmits the current album data to the external server 70 of the album creation service via the network 60. Furthermore, in a case when the data is outputted by the printer A directly connected to the information processing apparatus 10, a print command is transmitted to the printer A. Then, the present processing is finished.

Incidentally, a description has been given on the assumption that images having a reliability of "false" are basically few, but there may also be a case when the photographing date and time of most of the image files included in the folder specified in step S302 is unclear. In such a case, even if the image layout sequence is performed in step S201, it can also be assumed that the user makes major changes in the end in step S204.

In consideration of such a situation, for example, in a case when the list shown in FIG. 5 created in step S303 includes image data having a reliability of "false," the number of which being not fewer than a predetermined number of pieces, a step of allowing a user to confirm the order of photographing date and time at this point may be provided. More specifically, between step S303 and step S304, a step disclosed in Japanese Patent No. 5094528 may be inserted. In a case when there are a large number of images to be confirmed, a rearrangement operation of the images listed in one row has a smaller workload for the user as compared to rearrangement operation after the grouping and layout as shown in FIG. 11.

According to the above-described present invention, it is possible to select image data having a high priority for a user and automatically create a photo album in which image data is laid out in the order of photographing date and time while taking a load off the user as much as possible.

Other Embodiments

In the above-described embodiment, the example of creating a photo album in which photographs are laid out on a plurality of pages has been described. However, the present invention is not limited to this. For example, a plurality of images may be laid out and data on one post card, a booklet, and the like, may be generated.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method operated by at least one processor by executing a program stored in at least one memory, the method comprising the steps of:
    obtaining a plurality of images;
    performing determination processing that determines whether each of the plurality of images has photographing date and time information;
    setting predetermined information for an image that has no photographing date and time information among the plurality of images, based on the determination processing;
    scoring each of the plurality of images;
    selecting at least a portion of the plurality of images based on a score obtained by the scoring; and
    arranging the at least a portion of the plurality of images on a template,
    wherein, in a case when a first image having photographic date and time information and a second image not having photographic date and time information are selected based on a score of the first image and a score of the second image, the first image and the second image are arranged on the template based on the photographic date and time information of the first image and a time stamp of the second image, and,
    wherein, in a case when the second image is arranged on the template, a message is notified to a user based on the set predetermined information.

2. The information processing method according to claim 1, further comprising accepting a layout change by a user.

3. The information processing method according to claim 2, wherein a change in an image arrangement area is accepted by moving the arranged image based on a drag-and-drop operation by a user.

4. The information processing method according to claim 2, wherein replacement by page or by a double-page spread is accepted by moving a thumbnail corresponding to the arranged page or double-page spread based on a drag-and-drop operation by a user.

5. The information processing method according to claim 2, further comprising updating the photographing date and time information according to a layout as changed by accepting the layout change.

6. The information processing method according to claim 1, further comprising dividing the plurality of images into a plurality of groups by associating the plurality of images with a plurality of pages included in the template according to the photographing date and time information or the time stamp,
    wherein, for each of the plurality of groups, an image arranged on a corresponding page is selected from the plurality of images, and the selected image is arranged on the corresponding page in order of the photographing date and time information or the time stamp.

7. The information processing method according to claim 1, further comprising accepting a layout change by page by a drag-and-drop of a thumbnail corresponding to a page or double-page spread on which images are arranged.

8. The information processing method according to claim 1, further comprising uploading data on a layout result obtained by completing arrangement of images on the template to an external server via a network.

9. The information processing method according to claim 1, wherein a score of each image is obtained based on at least one of rating information included in image meta information, a face detection result, a histogram of image data, a frequency analysis result, and the reliability information.

10. The information processing method according to claim 1, wherein data on a photo album composed of a plurality of pages is generated as a layout result by the arranging of the images.

11. The information processing method according to claim 1, wherein, in a case when the second image is not arranged on the template, the message is not notified to a user.

12. The information processing method according to claim 1, wherein the time stamp of the second image includes at least one of a creation date and time of the second image, a load date and time of the second image, and an update date and time of the second image.

13. An information processing apparatus operated by at least one processor by executing a program stored in at least one memory, the apparatus comprising:
    an obtaining unit configured to obtain a plurality of images;

a performing unit configured to perform determination processing that determines whether each of the plurality of image has photographing date and time information;

a setting unit configured to set predetermined information for an image that has no photographing date and time information among the plurality of images, based on the determination processing;

a scoring unit configured to score each of the plurality of images;

a selecting unit configured to select at least a portion of the plurality of images based on a score obtained by the scoring unit; and an arranging unit configured to arrange the at least a portion of the plurality of images on a template, wherein, in a case when a first image having photographic date and time information and a second image not having photographic date and time information are selected based on a score of the first image and a score of the second image, the first image and the second image are arranged on the template based on the photographic date and time information of the first image and a time stamp of the second image, and, wherein, in a case when the second image is arranged on the template, a message is notified to a user based on the set predetermined information.

14. The information processing apparatus according to claim 13, further comprising an accepting unit configured to accept a layout change by a user.

15. The information processing apparatus according to claim 14, wherein a change in an image arrangement area is accepted by moving the arranged image based on a drag-and-drop operation by a user.

16. The information processing apparatus according to claim 14, wherein replacement by page or by the double-page spread is accepted by moving a thumbnail corresponding to the arranged page or double-page spread based on a drag-and-drop operation by a user.

17. The information processing apparatus according to claim 14, further comprising an updating unit configured to update the photographing date and time information according to a layout as changed by accepting the layout change of the accepting unit.

18. The information processing apparatus according to claim 13, further comprising a dividing unit configured to divide the plurality of images into a plurality of groups by associating the plurality of images with a plurality of pages included in the template according to the photographing date and time information or the time stamp, wherein, for each of the plurality of groups, an image arranged on a corresponding page is selected from the plurality of images, and the selected image is arranged on the corresponding page in order of the photographing date and time information or the time stamp.

19. The information processing apparatus according to claim 13, further comprising a unit configured to accept a layout change by page by a drag-and-drop of a thumbnail corresponding to a page or double-page spread on which images are arranged.

20. The information processing apparatus according to claim 13, further comprising an uploading unit configured to upload data on a layout result obtained by completing arrangement of images on the template to an external server via a network.

21. The information processing apparatus according to claim 13, wherein a score of each image is obtained based on at least one of rating information included in image meta information, a face detection result, a histogram of image data, a frequency analysis result, and the reliability information.

22. The information processing apparatus according to claim 13, wherein data on a photo album composed of a plurality of pages is generated as a layout result by the arranged images.

23. The information processing apparatus according to claim 13, wherein, in a case when the second image is not arranged on the template, the message is not notified to a user.

24. The information processing apparatus according to claim 13, wherein the time stamp of the second image includes at least one of a creation date and time of the second image, a load date and time of the second image, and an update date and time of the second image.

* * * * *